United States Patent
Pineda Amo

(10) Patent No.: US 10,215,159 B2
(45) Date of Patent: Feb. 26, 2019

(54) METHOD OF STARTING A WIND TURBINE

(71) Applicant: ALSTOM RENEWABLE TECHNOLOGIES, Grenoble (FR)

(72) Inventor: Isaac Pineda Amo, Sant Cugat del Valles (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 656 days.

(21) Appl. No.: 14/760,415

(22) PCT Filed: Jan. 17, 2014

(86) PCT No.: PCT/EP2014/050875
§ 371 (c)(1),
(2) Date: Jul. 10, 2015

(87) PCT Pub. No.: WO2014/111504
PCT Pub. Date: Jul. 24, 2014

(65) Prior Publication Data
US 2015/0354534 A1    Dec. 10, 2015

Related U.S. Application Data

(60) Provisional application No. 61/802,962, filed on Mar. 18, 2013.

(30) Foreign Application Priority Data

Jan. 17, 2013    (EP) .................................... 13382015

(51) Int. Cl.
F03D 7/02    (2006.01)
(52) U.S. Cl.
CPC .......... F03D 7/026 (2013.01); F03D 7/0224 (2013.01); Y02E 10/723 (2013.01)

(58) Field of Classification Search
CPC ............................... F03D 7/026; F03D 7/0224
See application file for complete search history.

(56) References Cited

U.S. PATENT DOCUMENTS 2,529,450 A    11/1950   Hornfeck
2,629,450 A    2/1953   Fumagalli
(Continued)

FOREIGN PATENT DOCUMENTS

EP    2 481 916    8/2012
GB    2 398 841    9/2004
(Continued)

OTHER PUBLICATIONS

International Search Report and Written Opinion for PCT/EP2014/050875, dated Apr. 4, 2014, 9 pgs.
(Continued)

*Primary Examiner* — Justin Seabe
(74) *Attorney, Agent, or Firm* — Dority & Manning, P.A.

(57) ABSTRACT

Methods of starting a wind turbine from a standstill substantially until generator connection, the wind turbine having a rotor with one or more blades, a pitch system for rotating the blades along their longitudinal axes and a generator operationally connected with the rotor. In standstill, the blades are substantially in a feathered position and the generator is not generating electrical power. The methods may comprise measuring the wind speed representative for the wind turbine and measuring the rotor speed of the wind turbine, and when the rotor speed is not equal to zero, determining the tip speed ratio for the wind turbine, and determining the pitch angle of the blades as a function of the tip speed ratio to optimize the torque produced by the blades of the wind turbine rotor.

16 Claims, 7 Drawing Sheets

(56) References Cited

U.S. PATENT DOCUMENTS

| | | | |
|---|---|---|---|
| 4,160,170 A | 7/1979 | Harner et al. | |
| 4,257,736 A | 3/1981 | Jacobs | |
| 7,298,059 B2* | 11/2007 | Delmerico | F03D 7/028 |
| | | | 307/85 |
| 7,602,075 B2* | 10/2009 | Erdman | F03D 7/0224 |
| | | | 290/40 R |
| 8,025,476 B2* | 9/2011 | Zheng | F03D 7/0224 |
| | | | 415/1 |
| 8,198,742 B2* | 6/2012 | Jorgensen | F03D 7/0224 |
| | | | 290/44 |
| 8,232,662 B2* | 7/2012 | Baba | F03D 7/0224 |
| | | | 290/44 |
| 8,793,027 B2* | 7/2014 | Nyborg | F03D 7/0224 |
| | | | 290/44 |
| 9,709,034 B2* | 7/2017 | Kjær | F03D 7/0224 |
| 2013/0045098 A1* | 2/2013 | Taylor | F03D 7/0224 |
| | | | 416/1 |

FOREIGN PATENT DOCUMENTS

| | | |
|---|---|---|
| GB | 2 479 413 A | 10/2011 |
| JP | S59176473 | 10/1984 |
| WO | WO 2007/053036 | 5/2007 |
| WO | WO 2008/006020 | 1/2008 |

OTHER PUBLICATIONS

Erich Hau, "Wind Turbines, Fundamentals, Technologies, Application, Economics", Chapter 5, Rotor Aerodynamics, 70 pgs.
Office Action issued in connection with corresponding EP Application No. 13382015.9 dated Jul. 6, 2017.

\* cited by examiner

METHOD OF STARTING A WIND TURBINE

This application claims the benefit of European Patent Application EP13382015.9 filed on Jan. 17, 2013 and U.S. Provisional Patent Application Ser. No. 61/802,962 filed on Mar. 18, 2013.

The present disclosure relates to methods of starting a wind turbine.

BACKGROUND

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A variable speed wind turbine may typically be controlled by varying the generator torque and the pitch angle of the blades. As a result, aerodynamic torque, rotor speed and electrical power will vary.

A common prior art control strategy of a variable speed wind turbine is described with reference to FIG. 1. In FIG. 1, the operation of a typical variable speed wind turbine is illustrated in terms of the pitch angle ($\beta$), the electrical power generated (P), the generator torque (M) and the rotational velocity of the rotor ($\omega$), as a function of the wind speed.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be varied so as keep the tip speed ratio $\lambda$ (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:

$T = k \cdot \omega^2$, wherein k is a constant, and $\omega$ is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed is kept constant, and the generator torque is varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch is actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The before described operation may be translated into a so-called power curve, such as the one shown in FIG. 1. Such a power curve may reflect the optimum operation of the wind turbine under steady-state conditions. However, in non-steady state (transient) conditions, the operation may not necessarily be optimum.

As further background, basic aerodynamic behaviour of (the blades of) a wind turbine is explained with reference to FIGS. 2a-2e.

In FIG. 2a, a profile of a wind turbine blade is depicted in operation. The forces generated by the aerodynamic profile are determined by the wind that the profile "experiences", the effective wind speed $V_e$. The effective wind speed is composed of the axial free stream wind speed $V_a$ and the tangential speed of the profile $V_t$. The tangential speed of the profile $V_t$ is determined by the instantaneous rotor speed $\omega$ and the distance to the centre of rotation of the profile, the local radius r, i.e. $V_t = \omega \cdot r$.

The axial free stream wind speed $V_a$ is directly dependent on the wind speed $V_w$, and on the speed of the wind downstream from the rotor $V_{down}$, that is $V_a = \frac{1}{2}(V_w + V_{down})$. The axial free stream wind speed may e.g. be equal to approximately two thirds of the wind speed $V_w$.

The resultant wind flow, or effective wind speed $V_e$, generates lift L and drag D on the blade. A blade may theoretically be divided in an infinite number of blade sections, each blade section having its own local radius and its own local aerodynamic profile. For any given rotor speed, the tangential speed of each blade section will depend on its distance to the rotational axis of the hub (herein referred to as local radius).

The lift generated by a blade (section) depends on the effective wind speed $V_e$, and on the angle of attack of the blade (section) a, in accordance with the following formula:

$$L = \frac{1}{2} \rho \cdot C_L V_e^2 \cdot S,$$

wherein
$\rho$ is the air density, $V_e$ is the effective wind speed, $C_L$ is the lift coefficient (dependent on the angle of attack $\alpha$) and S is the surface of the blade section.

Similarly, the drag D generated by a blade section can be determined in accordance with the following equation:

$$D = \frac{1}{2} \rho \cdot C_D V_e^2 \cdot S,$$

wherein $C_D$ is the drag coefficient, dependent on the angle of attack $\alpha$.

For an entire wind turbine blade, the contribution to lift and drag of each blade section may be summed to arrive at the total drag and lift generated by the blade.

Both the drag coefficient $C_D$ and the lift coefficient $C_L$ depend on the profile or the blade section and vary as a function of the angle of attack of the blade section. The angle of attack α may be defined as the angle between the chord line of a profile (or blade section) and the vector of the effective wind flow.

FIG. 2b illustrates in a very general manner how the lift coefficient and drag coefficient may vary as a function of the angle of attack of a blade section. Generally, the lift coefficient (reference sign 21) increases to a certain maximum at a so-called critical angle of attack 23. This critical angle of attack is also sometimes referred to as stall angle. The drag coefficient (reference sign 22) may generally be quite low and starts increasing in an important manner close to the critical angle of attack 23. This rapid change in aerodynamic behaviour of a profile or blade section is linked generally to the phenomenon that the aerodynamic flow around the profile (or blade section) is not able to follow the aerodynamic contour and the flow separates from the profile. The separation causes a wake of turbulent flow, which reduces the lift of a profile and increases the drag significantly.

The exact curves of the lift coefficient and drag coefficient may vary significantly in accordance with the aerodynamic profile chosen. However, in general, regardless of the aerodynamic profile chosen, a trend to increasing lift up until a critical angle of attack and also a rapid increase in drag after a critical angle of attack can be found.

In accordance with FIG. 2a, the tangential force generated by a blade section is given by $T=L \cdot \sin(\alpha+\vartheta)-D \cdot \cos(\alpha+\vartheta)$, wherein $\vartheta$ is the pitch angle and α is the angle of attack. The pitch angle may be defined as the angle between the rotor plane and the chord line of a profile. Integrating the tangential force distribution over the radius provides the driving torque.

In order to increase the torque generated by the rotor, the angle of attack of any blade section is preferably kept below the critical angle of attack such that lift may be higher and drag may be lower.

It should be borne in mind that the angle of attack of each blade section depends on the tangential speed of the specific rotor blade section, the wind speed, the pitch angle and the local twist angle of the blade section. The local twist angle of a blade section may generally be considered constant, unless some kind of deformable blade is used. The tangential speed of the rotor blade section depends on the rotor speed (angular velocity of the rotor which is obviously the same for the whole blade and thus for each blade section) and on the distance of the blade section to the rotational axis.

For a given pitch angle, it follows that the angle of attack is determined by the tip speed ratio:

$$\lambda = \frac{\omega \cdot R}{V_w}.$$

From this, it follows that the torque generated by a rotor blade section may become a rather complicated function of the instantaneous tip speed ratio and the pitch angle of the blade.

This complicated relationship between the tip speed ratio, pitch angle, and performance (e.g. torque) of the rotor may be depicted in a three-dimensional figure, such as the one shown as FIG. 2c.

For every rotor blade section, the torque generated may be depicted by a line such as one of the lines shown in FIG. 2d of constant pitch angle or similar. (This FIG. 2d is from Erich Hau, "*Wind Turbines, Fundamentals, Technologies, Application, Economics*".)

These lines depict the torque coefficient ($C_Q$), i.e. the ratio between the torque developed by the wind turbine rotor and the maximum theoretical torque. Such lines may be obtained by a cross-section of the plane of constant pitch angle with the plane depicted in FIG. 2c. For each pitch angle, there is a certain critical tip speed ratio for which maximum torque generation is achieved.

This may be illustrated in an alternative manner, such as shown in FIG. 2e. For a given tip speed ratio, e.g., $\lambda_1$, there is a certain critical pitch angle $\vartheta_{crit}$. This critical pitch angle gives the before-mentioned critical angle of attack for the given tip speed ratio. Below the pitch angle, stall may occur. At the same time, at the critical pitch angle, the generated torque is maximum.

During start-up of a wind turbine from standstill to normal operation, the blades generally have to be rotated from a feather position towards an operational position. With reference to FIG. 3a, the blade may be rotated from a feathered position 32 towards an operational position 31, which in this case is shown to be an operation with zero degrees pitch, i.e. the chord line of the blade section lies in the plane of rotation.

However, the final operational position of the blade may depend upon the wind conditions at that specific moment. Start-up may be performed under conditions of generally low wind, e.g. because the wind turbine operation was interrupted because of relatively low wind speeds. Start-up may also be performed under conditions of relatively high wind speeds, e.g. because the wind turbine operation was interrupted at high wind speeds in order to avoid high loads on the wind turbine. Start-up may also be formed in any intermediate wind situation. This may be the case when wind turbine operation was interrupted for e.g. maintenance.

As the blade is rotated from a feathered position towards an operational position, the pitch angle will vary between approximately 90° (feather position) and the final pitch angle in operation, which could generally be in the range of e.g. 0°-30°. During start-up, the speed of rotation and thus the tangential velocity of a blade section may be relatively small as compared to normal operation. And as mentioned before, the wind speed could vary from very low to very high. The angle of attack of the blades may thus also vary widely.

During start-up, as the wind turbine rotor starts rotating and increases the rotor speed, and as the blade is pitched, the angle of attack of the blade undergoes a complicated transition. In this sense, the angle of attack of the blade may be defined as the angle of attack of a representative blade section. As explained before, each blade section may have its own angle of attack at any given moment. The representative blade section may be chosen at e.g. 25% of the blade length.

In a known method of starting-up a wind turbine, the blade is generally rotated at a given constant rate, regardless of the prevailing wind conditions, until the rotor starts rotating. This pitch rate is generally chosen to be relatively low, in order to avoid stall when the wind turbine is started up in conditions of relatively high wind speeds.

When the rotor starts rotating, the pitch rate is changed to a predetermined, higher second level, regardless of the prevailing wind conditions. This pitch rate is chosen to be higher so that the blades can speed up faster. If however, the pitch rate were chosen too high, under low wind speed conditions, stall could occur.

In the final phase of start-up, a look-up table of pitch angles vs. generator speed (or rotor speed) may be used until proper operation is started, i.e. until the generator is generating electrical power.

Using this method, start-up may take longer than needed, which means that less electrical power is generated.

In another method, disclosed in U.S. Pat. No. 4,160,170, both wind speed and rotor speed are taken into account during start-up. For different rotor speeds, blade pitch angles are established depending on the wind speed.

There still exists a need for a method of starting up a wind turbine which effectively reduces start-up time while simultaneously keeping blade loads etc. under control e.g. by avoiding stall of the wind turbine blade. This need is fulfilled in various examples of the present disclosure.

SUMMARY

According to a first aspect, a method of starting a wind turbine from a standstill substantially until generator connection is provided, the wind turbine having a rotor with one or more blades, a pitch system for rotating the blades along their longitudinal axes and a generator operationally connected with the rotor. In standstill, the rotor speed of the wind turbine is zero, the blades are substantially in a feathered position and the generator is not generating electrical power. The method comprises measuring the wind speed representative for the wind turbine and measuring the rotor speed of the wind turbine, and when the rotor speed is not equal to zero, determining the tip speed ratio for the wind turbine, and determining the pitch angle of the blades as a function of the tip speed ratio to optimize the torque produced by the blades of the wind turbine rotor.

In accordance with this aspect, at any given moment once the wind turbine is rotating, the pitch angle is determined based on the tip speed ratio such as to optimize the torque produced by the blades at any given moment. This way, the time until start-up, until generator connection (i.e. the moment at which the wind turbine starts generating electrical power) may be minimized.

Optionally, when the rotor speed is equal to zero, the blades are rotated with a substantially constant pitch rate. In some examples, the constant pitch rate may be determined as a function of the wind speed when starting the wind turbine. For example, if the wind speed when starting the wind turbine is below a threshold, the constant pitch rate is equal to a first value, and if the wind speed when starting the wind turbine is above the threshold, the constant pitch rate is equal to a second value, wherein the second value being higher than said first value. When the blades are not rotating, the tip speed ratio by definition will be zero. In order to start rotating, the wind turbine blades will have to be rotated away from the feather position. The pitch rate chosen may be made dependent upon the prevailing wind conditions at start-up. If the wind speed is high, then a lower rate of pitch may need to be chosen, so that the blades do not enter into stall before operation starts. If the blades enter into stall, then the rotor will not start rotating. If the wind speed is relatively low, then a higher rate of pitch may be chosen, as the risk of entering into a stall condition is low and this way the time until operation starts may be limited.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 4:
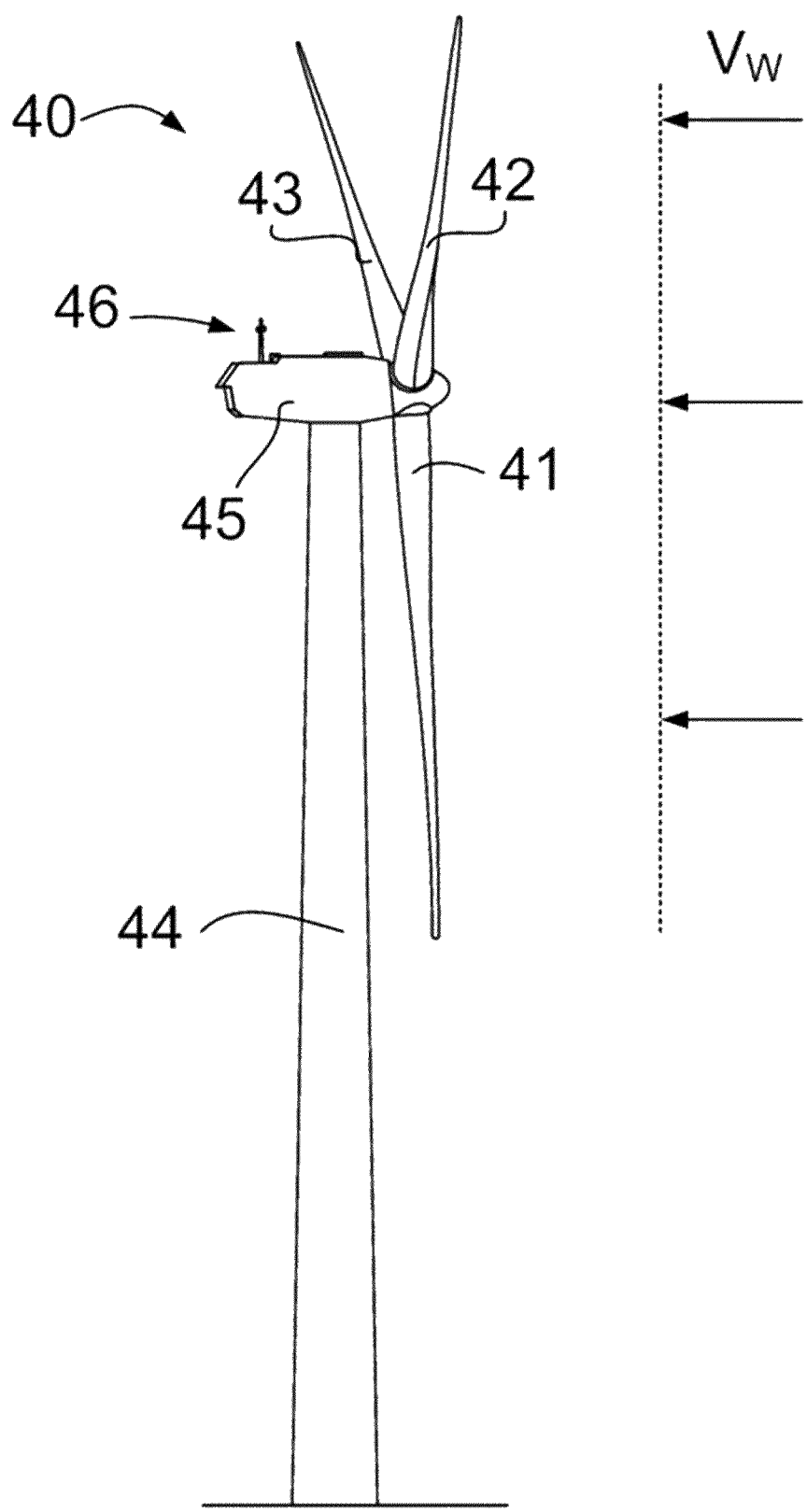
FIG. 4 illustrates a wind turbine.

FIG. 4 illustrates a wind turbine 40 having a rotor with three blades 41, 42 and 43. A nacelle 45 is mounted on wind turbine tower 44. An anemometer 46 is mounted on the nacelle 45. The anemometer 46 may be used to measure wind speed, however because of its location on the nacelle, behind the rotor, the wind speed measured by the anemometer may vary a lot and in general may not be very reliable.

Figure 3A:
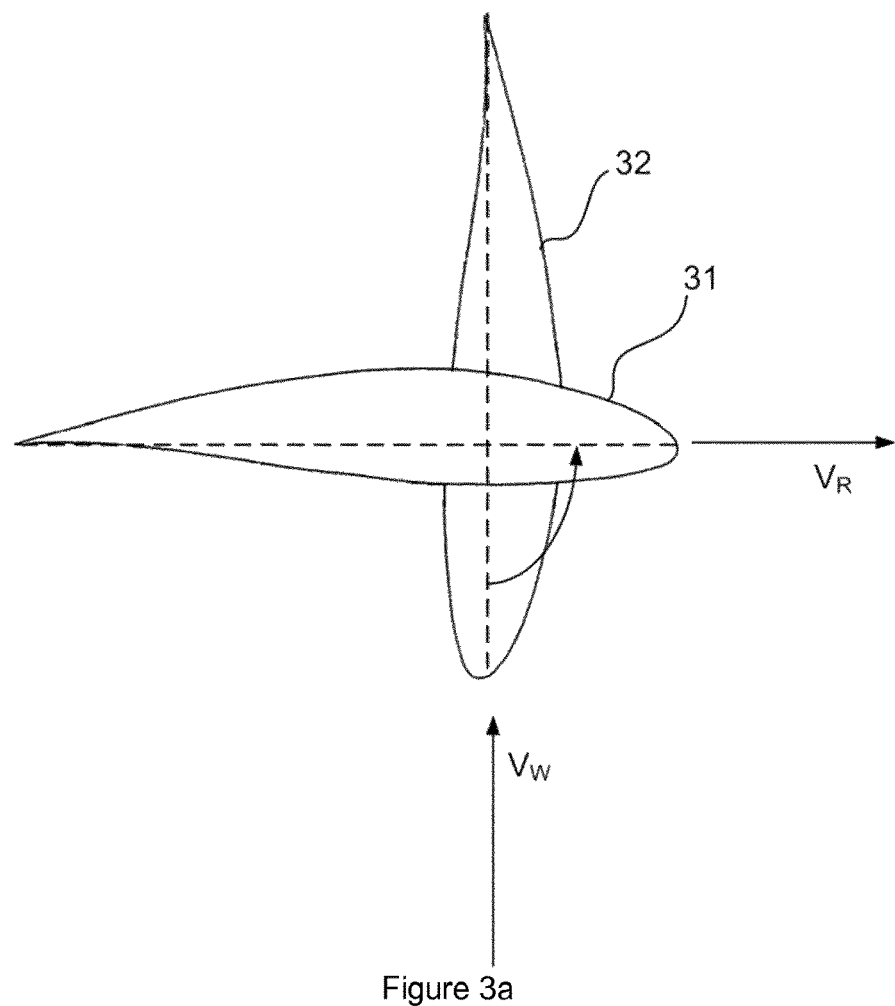
FIGS. 3a and 3b illustrate the process of pitching the wind turbine blades from a feather position towards an operational position.
Figure 3B:
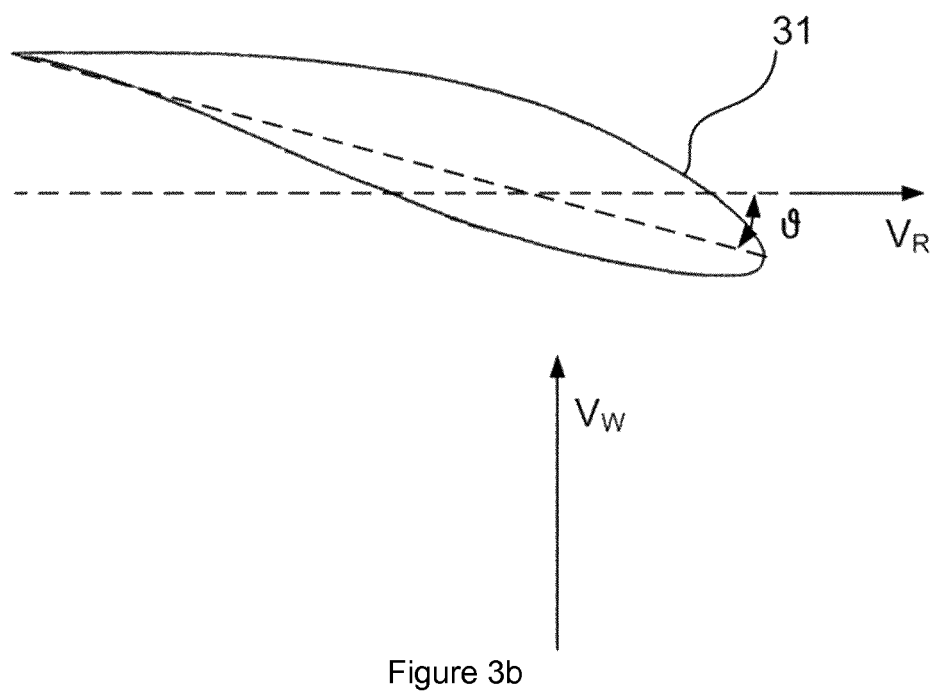

During start-up, in a first phase, the blades are rotated from a feather position towards an operational position. Depending on the wind conditions, such operational position may correspond to a zero degrees pitch angle (such as illustrated in FIG. 3a) or to a non-zero degrees pitch angle (e.g. as illustrated in FIG. 3b). In an example, this first phase may involve pitching the blades with a constant pitch rate.

This pitch rate may be chosen such as to be suitable for any wind condition. In another example, two different pitch rates may be defined, one for high wind speeds, and another for low wind speeds. If the wind speed is higher than a threshold, the wind speed may be qualified as "high". If the wind speed is lower than this threshold, the wind speed may be qualified as "low".

Depending on whether the wind speed is "high" or "low", the pitch rate may be adapted. For low wind speed, a pitch rate of e.g. 3°-5°/second may be acceptable, with the risk of entering into stall being very low. The higher pitch rate will make sure that start-up is quick and efficient. For high wind speeds, a pitch rate of e.g. 0.5°/second may be more suitable. If the blades are rotated at a higher rate, they may enter into stall, and the start-up may thus be unsuccessful.

In further examples, three or more different pitch rates may be defined, each of them suitable for a certain range of wind speeds. Alternatively, the pitch rate might be varied continuously as a function of instantaneous wind speed, and/or the instantaneous pitch angle. For doing so, either an analytical expression or interpolated from values in a table might be employed.

It may be suitable to use a relatively high first pitch rate. As the pitch angle is changed, and the wind turbine is getting closer to the rotor starting to move, it may be appropriate to use a relatively low pitch rate. The pitch rate may thus depend on the instantaneous pitch angle. To further optimize, also the instantaneous wind speed may be taken into account.

Once the rotor starts rotating, the tip speed ratio may be used to determine the most suitable pitch angle at any given moment. As mentioned before, tip speed ratio may generally be defined as $$\lambda = \frac{\omega \cdot R}{V_w},$$

wherein ω is the rotational speed of the rotor, R is the radius of the rotor swept area and $V_w$ is the wind speed.

The wind speed may be measured e.g. using a LIDAR or using a nacelle mounted anemometer. If an anemometer mounted on the nacelle is used, an average wind speed over a short period of time e.g. 1-5 seconds may be used to have a more reliable indicator of the wind speed. In an example, an average wind speed measured during three seconds may be used. In further alternative examples, a wind speed representative for the (swept area) of a wind turbine may be measured at a different site, close to the wind turbine, instead of at the wind turbine. This may be done e.g. in a neighbouring wind turbine or using a measurement post.

Thus, at any given moment, the actual wind speed may be known. Also, the rotor speed at any given moment may be measured e.g. by measuring the generator speed. As such, the tip speed ratio is known at any given moment. Given the tip speed ratio, and using the information from a graph such as the one illustrated in FIG. 2e, at any given moment the pitch angle that gives the most torque for the rotor may be determined.

Figure 1:
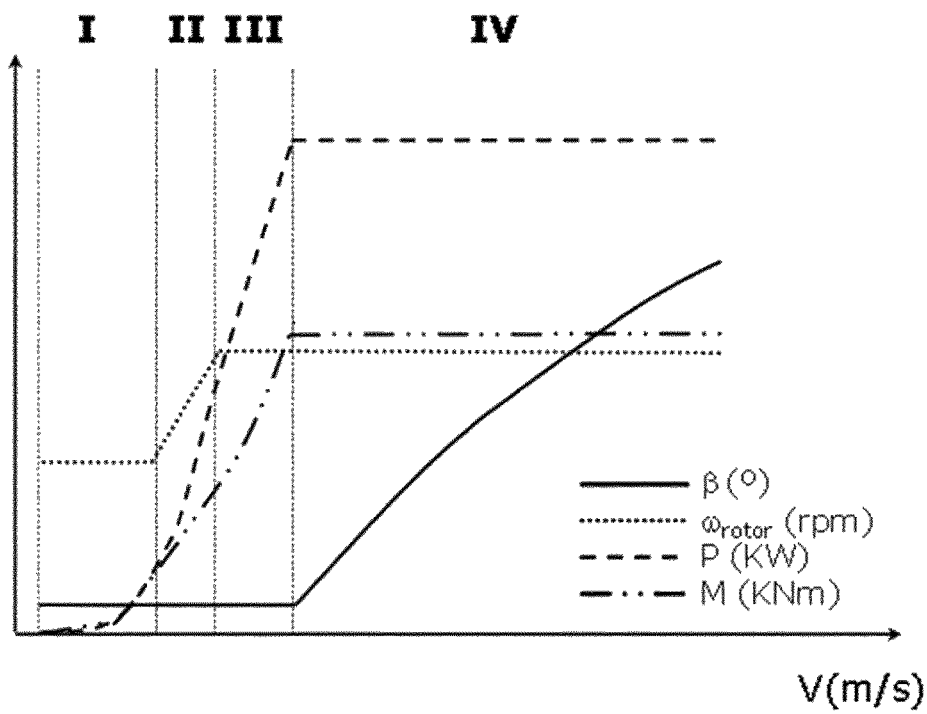
FIG. 1 illustrates a typical power curve of a wind turbine.
Figure 2A:
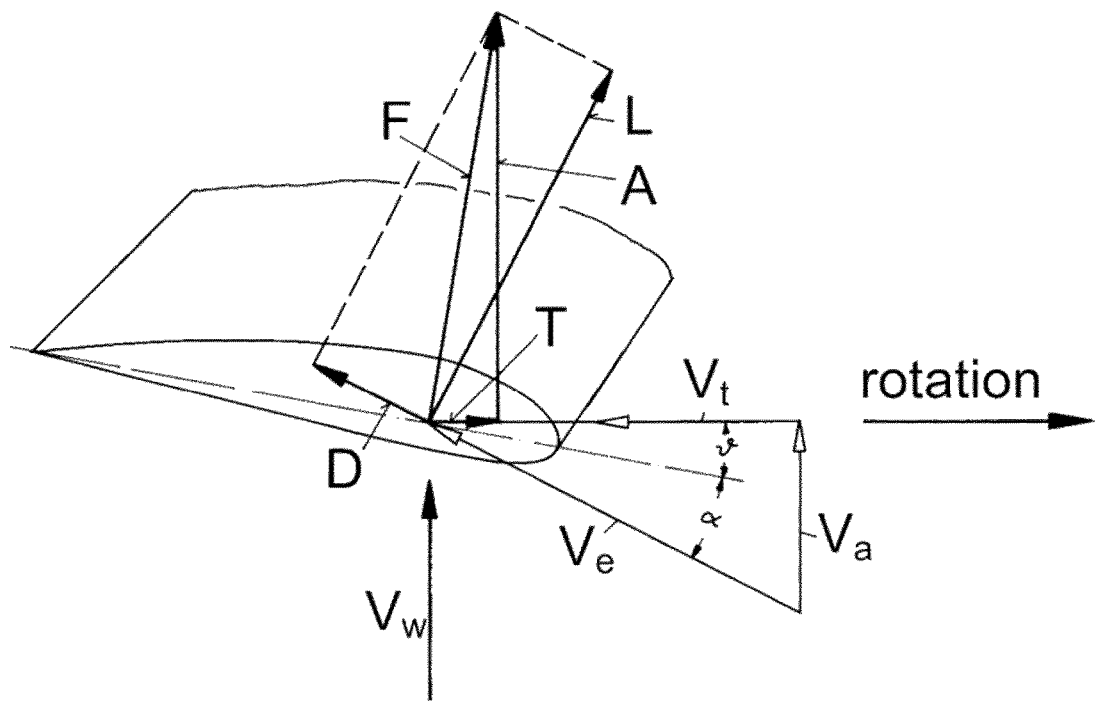
FIGS. 2a-2e illustrate aerodynamics of wind turbine blades and aerodynamic profiles in general.
Figure 2B:
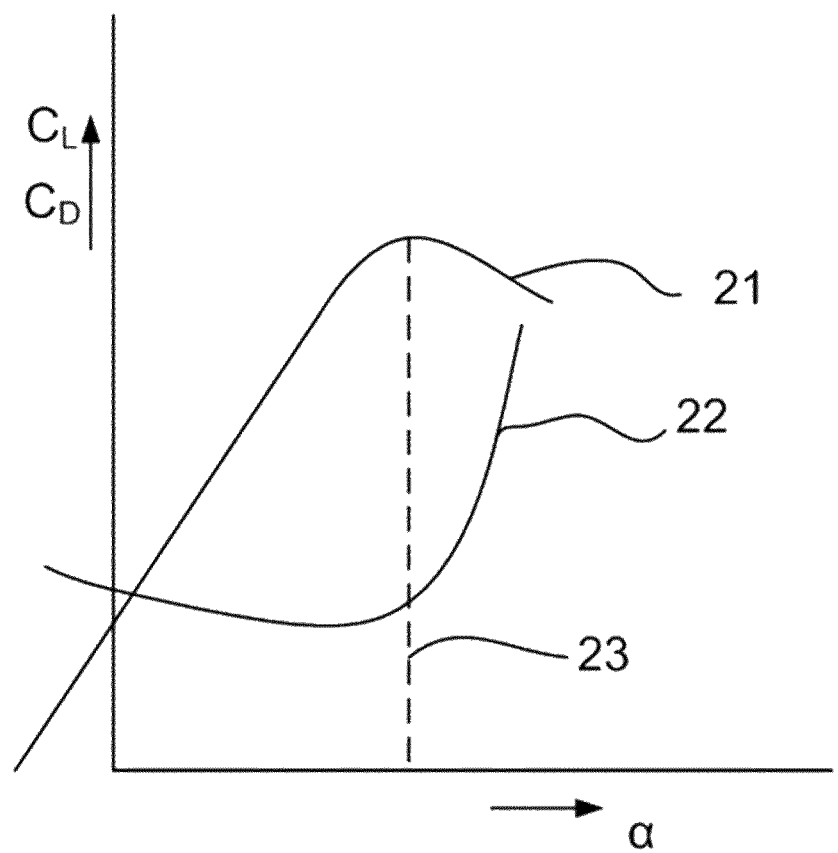
Figure 2C:
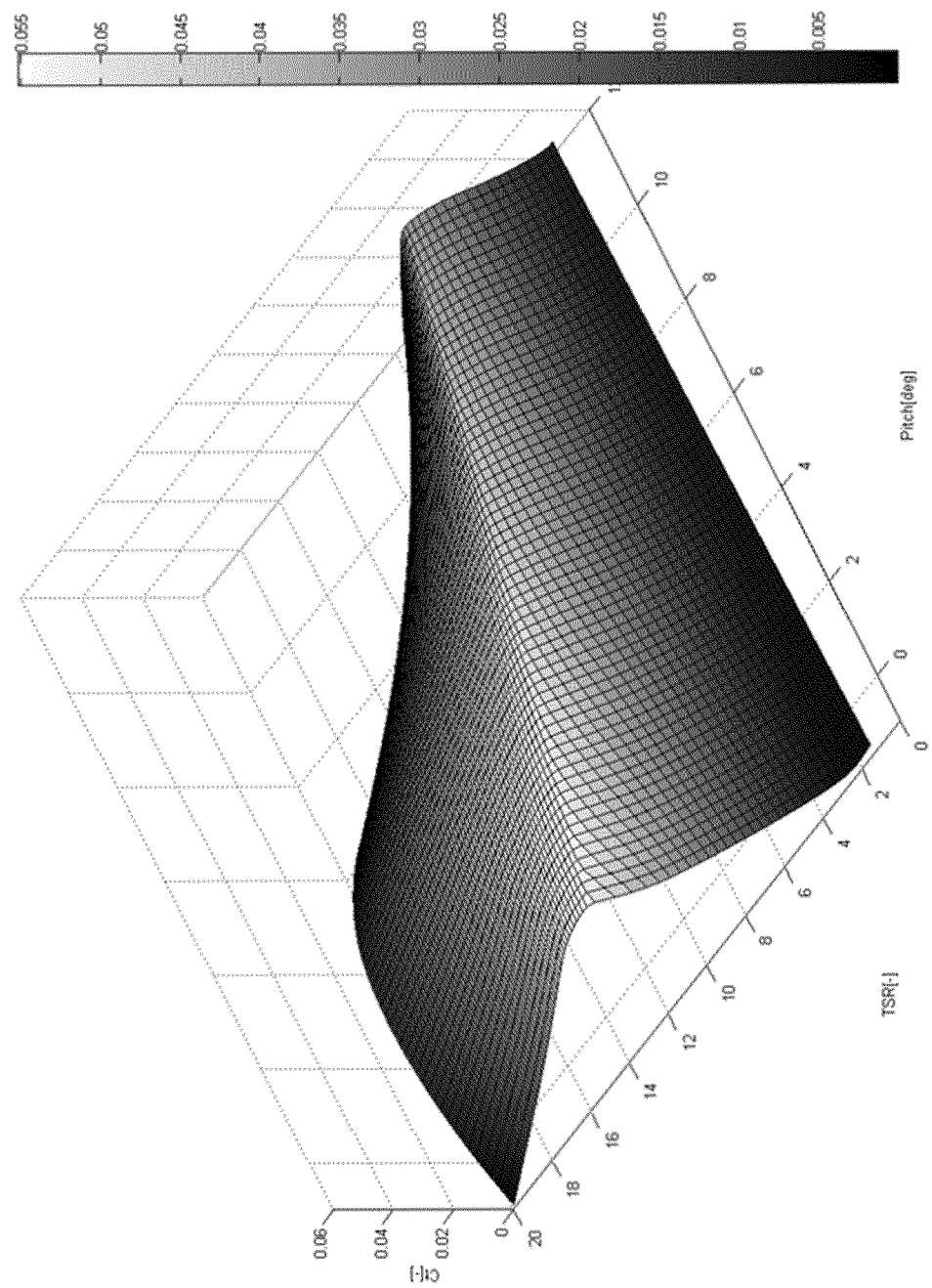
Figure 2D:
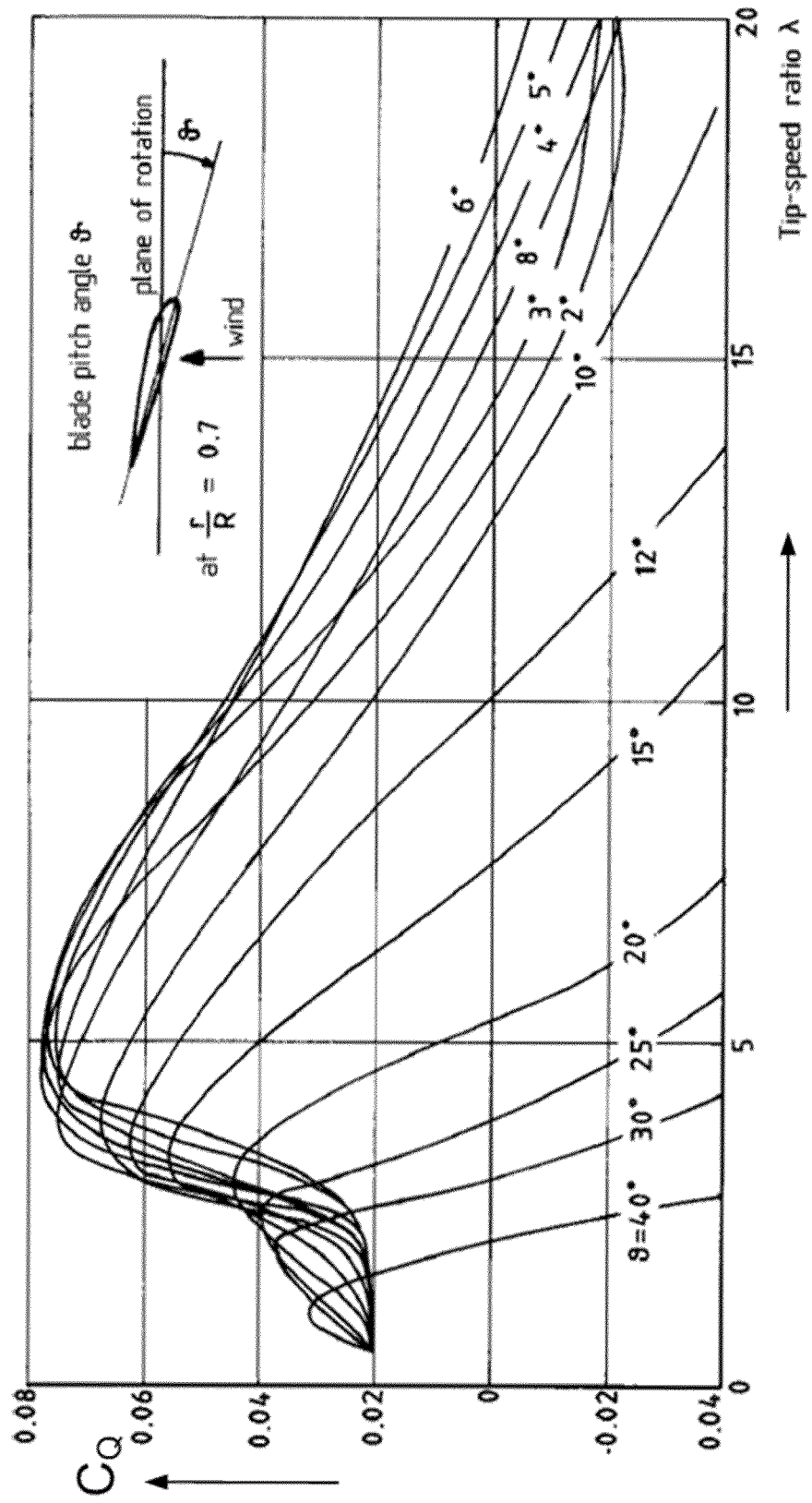
Figure 2E:
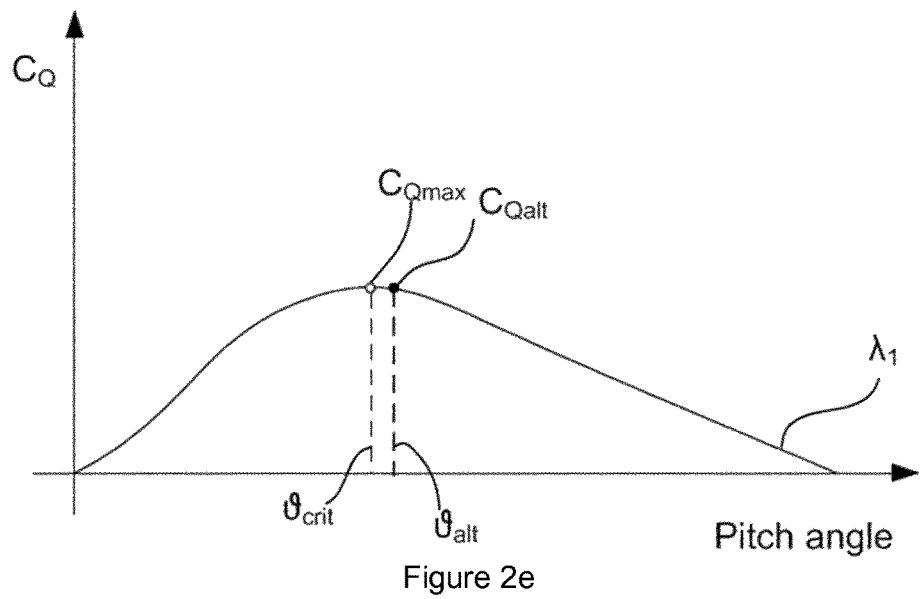

With reference to FIG. 2e, if the instantaneous tip speed ratio is $\lambda_1$, the pitch angle for the maximum torque is given by the pitch angle corresponding to $\vartheta_{crit}$. Optionally, the pitch angle may be chosen slightly higher (and the angle of attack thus slightly smaller) than the critical angle for reasons of security, e.g. $\vartheta_{alt}$. For example, a 5% security margin may be taken into account. The torque generated is given by $C_{Qalt}$, which still may be very close to the maximum possible torque for the instantaneous tip speed ratio.

At any given moment, the instantaneous tip speed ratio may be determined in a reliable manner. Knowing the aerodynamics of the wind turbine blades, for a given tip speed ratio the ideal pitch angle can be determined. This may be implemented using e.g. a look-up table stored in the wind turbine control system, or alternatively in the SCADA of a wind park.

This way, regardless of the wind conditions, the start-up of the wind turbine may be efficient and thereby shortened.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of starting up a wind turbine from a standstill substantially until generator connection, the wind turbine having a rotor with a plurality of blades, a pitch system for rotating each of the blades along their respective longitudinal axes and a generator operationally connected with the rotor,
   wherein in standstill a rotor speed of the wind turbine is zero, the blades are substantially in a feathered position and the generator is not generating electrical power, the method comprising:
   measuring a wind speed representative for the wind turbine and measuring the rotor speed of the wind turbine,
   with the rotor speed equal to zero when starting up the wind turbine, rotating the blades with the pitch system at a constant positive pitch rate until the rotor starts to rotate,
   and when the rotor starts to rotate and rotor speed is not equal to zero,
   determining a tip speed ratio for the wind turbine, and
   determining a pitch angle of the blades as a function of the tip speed ratio and, with the pitch system, changing the pitch angle of the blades to the determined pitch angle.

2. The method according to claim 1, wherein
   if the wind speed when starting up the wind turbine is below a threshold, the constant pitch rate is equal to a first value, and
   if the wind speed when starting up the wind turbine is above the threshold, the constant pitch rate is equal to a second value,
   the second value being a lower pitch rate than the first value.

3. The method according to claim 2, wherein the first value is between 3-5° per second.

4. The method according to claim 3, wherein the second value is approximately 0.5 per second.

5. The method according to claim 1, wherein the wind speed representative for the wind turbine is measured using a LIDAR.

6. The method according to claim 1, wherein the wind speed representative for the wind turbine is measured using an anemometer arranged on the nacelle of the wind turbine.

7. The method according to claim 6, wherein the wind speed representative for the wind turbine is an average wind speed measured by the anemometer over a period of time.

8. The method according to claim 7, wherein the period of time is between one and five seconds.

9. The method according to claim 8, wherein the period of time is between two and four seconds.

10. The method according to claim 1, wherein the pitch angle of the blades as a function of the tip speed ratio is a critical pitch angle.

11. The method according to claim 1, wherein the pitch angle of the blades as a function of the tip speed ratio is a predefined percentage above a critical pitch angle.

12. The method according to claim 11, wherein the predefined percentage is 5%.

13. The method according to claim 1, wherein setting the pitch angle of the blades as a function of the tip speed ratio comprises obtaining the pitch angle from a look-up table.

14. A wind turbine control system configured to control a wind turbine having a plurality of blades from standstill substantially until a moment of connecting a generator, comprising:
   wherein the wind turbine control system is configured
   to receive a rotor speed and receive a wind speed representative for a wind turbine;
   with the rotor speed equal to zero when starting up the wind turbine, rotate the blades at a constant pitch rate, wherein the constant pitch rate is determined as a function of the received wind speed when starting the wind turbine until the rotor starts to rotate, and
   when the rotor starts to rotate and rotor speed is not equal to zero
   to determine a tip speed ratio for the wind turbine, and
   to determine a pitch angle of the blades as a function of a tip speed ratio; and
   change the pitch angle of the blades to the determined pitch angle by sending the determined pitch angle to one or more pitch systems of the wind turbine.

15. A wind turbine comprising a wind turbine control system according to claim 14.

16. The wind turbine according to claim 15, further comprising an anemometer for measuring the wind speed.

* * * * *